Aug. 13, 1968  S. W. TOBEY  3,397,115
EXTRACTION APPARATUS

Filed Aug. 7, 1967  2 Sheets-Sheet 1

INVENTOR.
Stephen W. Tobey
BY V. Dean Clausen
AGENT

United States Patent Office 3,397,115
Patented Aug. 13, 1968

3,397,115
EXTRACTION APPARATUS
Stephen W. Tobey, Sudbury, Mass., assignor to The Dow Chemical Company, Midland, Mich., a corporation of Delaware
Filed Aug. 7, 1967, Ser. No. 658,800
13 Claims. (Cl. 202—169)

ABSTRACT OF THE DISCLOSURE

This invention relates generally to extraction apparatus. More specifically, it concerns a solvent distributor tube which may be used in conjunction with an extraction apparatus unit comprising generally an extraction flask, a reboiler flask and an extractor head connecting both flasks. The distributor tube of this invention generally resembles a long stem funnel, with the stem portion comprising inner and outer tube portions joined at one end to define a chamber therebetween. The funnel portion of the tube opposite the joined ends communicates directly with the inner tube portion and is integral with the outer tube portion. The distributor tube is seated within the extractor head and provides communication between the extraction flask and the reboiler flask through ports located at opposite ends of the outer tube portion.

---

A typical apparatus for continuous extraction of a solute from a liquid phase with an extractant solvent which is more dense than and substantially immiscible with the phase to be extracted generally consists of an extractor head having a vapor tube and a return tube integral with and positioned exterior to the extractor head. The vapor tube-return tube assembly is connected to a reboiler flask and a reflux condenser is fitted to the top of the extractor head. In such an apparatus, a predetermined quantity of the extractant solvent and the liquid phase to be extratced are charged to the extractor body and an additional amount of the extractant solvent is placed in the reboiler flask. The extractant solvent in the reboiler flask is then vaporized and the fumes flow through the vapor tube and into the condenser. After condensing, the extractant solvent drips from the condenser into the liquid phase containing the solute, passes through the liquid phase and collects in the lower portion of the extractor body. When the extractant solvent in the extractor body fills the return tube to the point where the return tube bends back downwardly toward the reboiler flask, the solvent overflows back into the reboiler flask where it is again vaporized to continue the extraction cycle.

For continuous extraction of a substance present in a solid material, a typical apparatus which might be used is known to the art as a Soxhlet extractor. The extractor head or body of a Soxhlet apparatus fulfills essentially the same function as the apparatus described above. In extracting a solid material, however, the material is generally reduced to a powder or paste form and put into a porous cup which fits loosely in the body of the extractor. The condensed extractant solvent leaving the reflux condenser drips through the solid material in the porous cup and flows through the walls of the cup into the extractor body. When the extractant solvent surrounding the cup in the extractor body fills the extractor body and the return tube to its upper most end, the accumulated solvent siphons back into the reboiler flask essentially as in the apparatus described above. The solvent which is returned to the reboiler flask is again vaporized to provide a continuous extraction cycle.

The prior apparatus, such as those described above, have several disadvantages. A prime disadvantage is that the extractor head is designed such that the capacity of the head itself and the capacity of the flasks which can be used with the head are relatively limited, i.e. the unit will accommodate only a given amount of an extractant solvent together with the liquid or solid to be extracted. Another disadvantage is the complex and fragile design of the vapor tube and the return tube which form an integral part and are positioned exterior to the extractor head. Such parts are easily broken when the extractor head is being stored or when it is being set up for operation. Still another disadvantage is that the prior apparatus are generally designed for a specific type of extraction. For example, extraction of a solute from a liquid with a liquid solvent more dense than the phase to be extracted requires a certain apparatus; extraction of a solid material with a liquid solvent requires another type of apparatus; and extraction of a liquid with a liquid solvent less dense than the phase to be extracted requires still another type of apparatus.

A primary object of the present invention, therefore, is to provide an improved extraction apparatus which may be used to extract a variety of substances with solvents of various relative densities, all within the same extraction unit.

Still another object of this invention is to provide an improved apparatus which may be used with conventional equipment, particularly flasks of various sizes and capacties, to extract a soluble constituent from liquid solutions, from finely divided solids, or from solids dispersed in a liquid medium in which the volume of such solutions or dispersions may vary considerably.

Other objects and advantages of the present invention will be apparent from the following description taken in conjunction with the accompanying drawings.

The improved apparatus of the present invention is a tube which may be employed in an extraction system to distribute a solvent material into a solution or a dispersion to be extracted and to return the extracted solution to an appropriate part of the system for recovery of the solute therefrom. More specifically, the novel distributor tube of this invention comprises a tube of generally cylindrical configuration with an integral funnel-shaped top and having an outer tube portion enclosing and spaced apart from an inner tube portion, thereby providing a chamber between the respective tube portions. The inner tube portion defines a cylindrical conduit through which a solvent material may be distributed into a solution or dispersion to be extracted, which is contained in an extraction flask. Circular ports extending through the wall of the outer tube portion and into the chamber provide means for the extractant solvent to enter the chamber from the extraction flask and to exit from the chamber into an extractor head and thence into a reboiler flask where the extracted material may be recovered from the solvent. A particularly significant advantage of the present invention over the prior apparatus is the flexility of the apparatus, that is, its utility in an infinite number of extraction procedures. This is made possible by fitting a collar around the periphery of the distributor tube which provides means for seating the distributor tube within the extractor head so that it may be adjusted to any desired height to accommodate many different extraction flasks of various sizes. Additionally, the collar provides a liquid tight seal between the distributor tube and the extractor head to prevent the liquid in the extraction flask from rising into the extractor head.

The invention can be best understood from the following description taken in conjunction with the accompanying drawing. Corresponding parts of the illustrated embodiments have been designated by the same numerals in the several views with letter suffixes being applied where appropriate. In the drawings.

Figure 1:
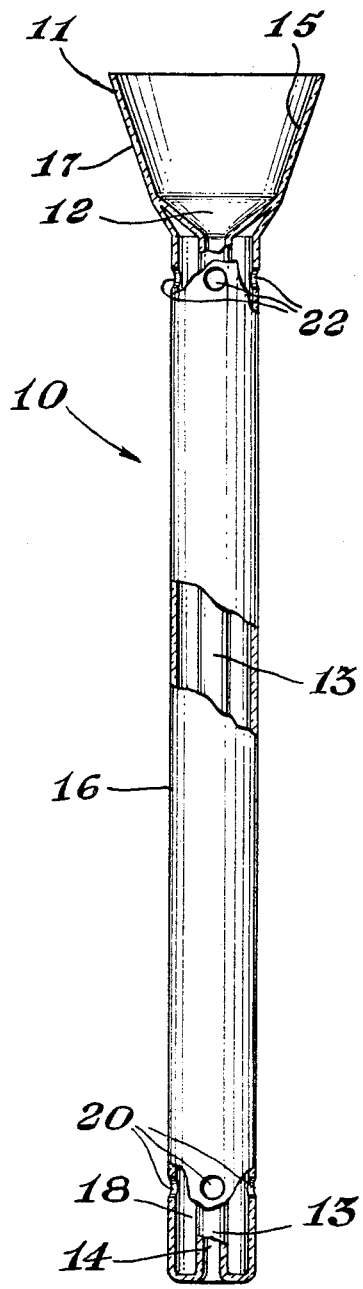
FIG. 1 is a side elevational view, partly in section, of the distributor tube of this invention.

In the drawing, as shown in FIG. 1, the distributor tube 10 comprises a device generally resembling a long stem funnel in which the stem portion extends downwardly from an integral radially outwardly flared funnel-shaped top 11. The inside wall surface 15 of the funnel-shaped top slopes inwardly and downwardly to an annular opening or mouth 12. Integral with and extending downwardly from mouth 12 along the entire stem portion is an inner cylindrical tube 13, defining a cylindrical conduit 14. Integral with and extending downwardly from the outer wall surface 17 of the funnel-shaped top is an outer cylindrical tube 16, which completely encloses and is spaced apart from inner tube 13. Inner tube 13 and outer tube 16 are sealingly joined at the ends opposite funnel-shaped top 11 so that the space between the tubes forms a hollow annular chamber 18. Located near the end of outer tube 16 opposite funnel-shaped top 11 are several spaced-apart circular holes, designated as first port means 20. Several similarly spaced-apart circular holes, designated as second port means 22, are located in outer tube 16 just below funnel-shaped top 11. Ports 20 and 22 extend only through the wall of outer tube 16 to provide openings for a liquid material, such as an extractant solvent, to enter chamber 18 (through ports 20) and to exit from chamber 18 (through ports 22). In the preferred form of this invention, the entry and exit ports each comprise a series of four circular holes, but it is not intended that the invention be limited to this embodiment. For example, in the practice of this invention, the number, shape, size and spacing of the port holes may be varied to suit the particular conditions of a given extraction procedure.

Figure 2:
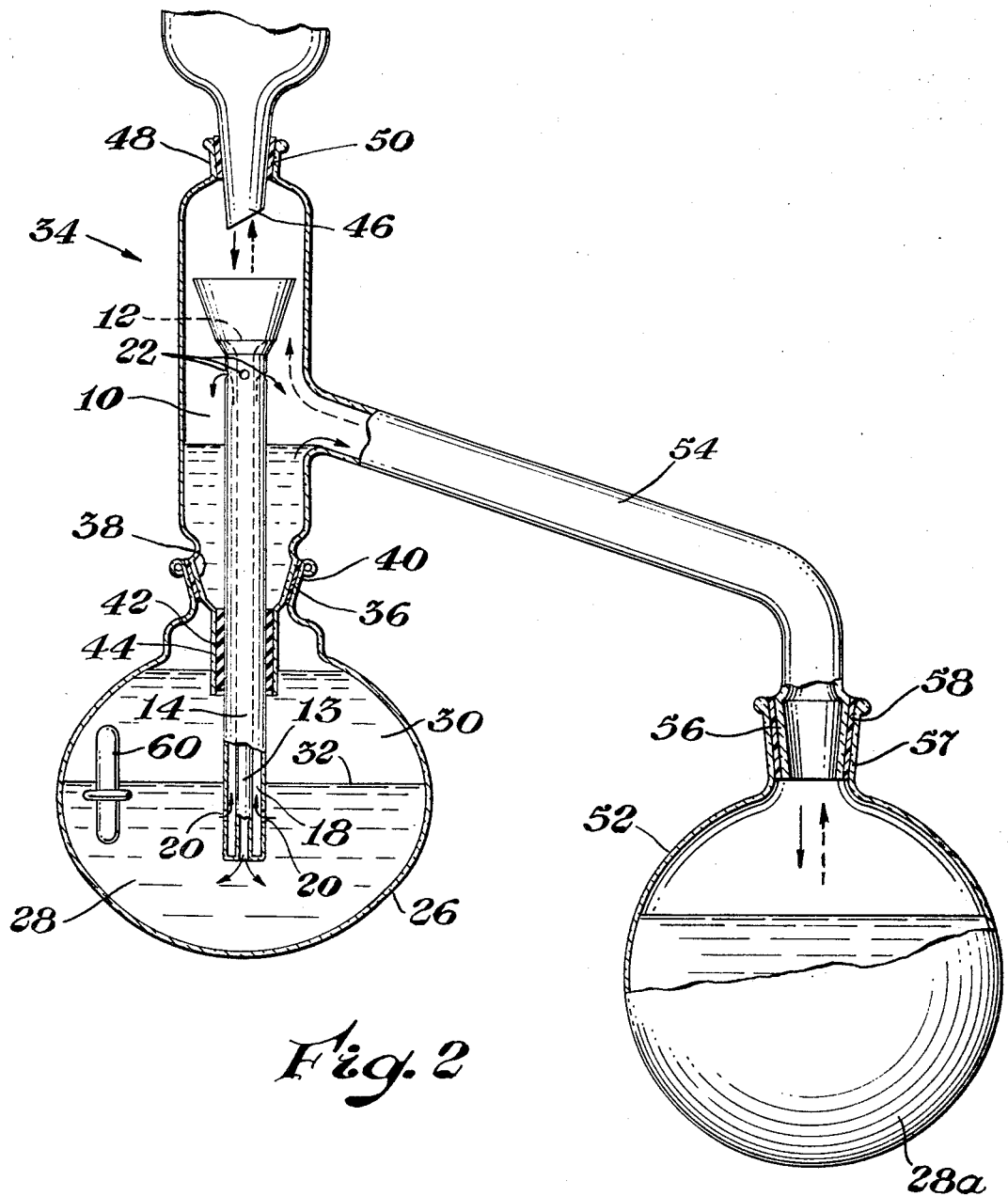
FIG. 2 is a side elevational view, partly in section, of an extraction apparatus illustrating use of the novel distributor tube in the extraction of a substance dissolved in a liquid phase with a liquid solvent.

FIG. 2 illustrates the use of the novel distributor tube of this invention in the extraction of a substance dissolved in a liquid phase with a liquid solvent which is more dense than the liquid phase to be extracted and substantially immiscible with the liquid phase. Representative of such an extraction procedure is the extraction of phenol from a water solution thereof using chloroform as the solvent.

As shown in FIG. 2, 2.50 grams of phenol was dissolved in 250 ml. of water and the aqueous solution was charged to an extraction flask 26 (500 ml. round bottom flask). To the extraction flask was then added 150 ml. of chloroform as the extractant solvent. Since chloroform is much more dense than water and susbtantially immiscible with water there was a distinct separation between the chloroform phase 28, which settled in the lower portion of the flask, and the aqueous phenol solution 30, which floated on the surface of the chloroform phase. Reference numeral 32 refers to the interface between the respective liquid phases.

An extractor head 34 was fitted to extraction flask 26, a "Teflon" polytetrafluoroethylene resin sleeve 36 on neck portion 38 of the extractor head provided sealing engagement between neck portion 38 and throat 40 of the extraction flask. Distributor tube 10 was inserted in extractor head 34 with a gum rubber collar 42 on tube 10 providing frictional engagement of tube 10 with throat portion 44 of the extractor head. The primary function of collar 42 is to provide a seal between throat portion 44 of extractor head 34 and distributor tube 10, which prevents the lighter aqueous phenol phase from rising into the body of the extractor head due to slight positive pressure exerted by the heavier chloroform phase. In addition, collar 42 provides a seat for distributor tube 10 by means of which tube 10 may be readily and conveniently adjusted vertically to any desired position in flask 26. This feature permits the distributor tube to be raised or lowered within the extractor head to accommodate a conventional extraction flask (such as illustrated by numeral 26) of anywhere from about 100 to 5000 ml. volume for extraction of a soluble constituent from between about 25 and 4000 ml. of a solution or a dispersion contained in the extraction flask.

In the embodiment illustrated in FIG. 2, distributor tube 10 was positioned in extractor head 34 so that port holes 20 were immersed a sufficient distance into the extractant solvent phase 28 to prevent the aqueous phenol solution 30 from entering port holes 20 during the extraction operation. A conventional reflux condenser (not shown) was attached to extractor head 34 so that the drip tip 46 of the condenser sealingly engaged throat portion 48 of the extractor head and extended a short distance into the body of the extractor head. A "Teflon" polytetrafluoroethylene resin sleeve 50 in throat portion 48 provided an adequate seal for this connection. An additional 150 ml. of the extractant solvent 28a (chloroform) was charged to reboiler flask 52 (500 ml. round bottom flask) and the flask was secured to return arm 54 of the extractor head by insertion of male joint 56 into throat 57 of the reboiler flask. A "Teflon" polytetrafluoroethylene resin sleeve 58 mounted on male joint 56 provided an adequate seal for this connection. The reboiler flask was mounted on a conventional heating mantle (not shown) which was attached to a power source.

In the extraction process, the reboiler flask was heated until the chloroform extractant solvent began to vaporize and the heat input to the reboiler flask was maintained so as to provide continuous vaporization of the solvent. The constantly vaporizing chloroform fumes flowed upward through return arm 54 into the body of extractor head 34 and through drip tip 46 into the reflux condenser, as illustrated by the broken arrows in FIG. 2 of the drawing. Upon condensing in the reflux condenser, the liquid solvent flowed downwardly through drip tip 46 and dropped in a continuous stream or a steady dropwise flow into funnel-shaped top 11 of distributor tube 10, thence into mouth 12 and descended through conduit 14 and into extractant solvent 28 in the lower portion of extraction flask 26, as illustrated by the solid arrows in FIG. 2 of the drawing.

A conventional magnet stirring bar 60 (coated with "Teflon" polytetrafluoroethylene resin) was rotated slowly at interface 32 by means of an external motor driven rotating magnet (not shown) to agitate interface 32 separating the extractant solvent (chloroform) phase 28 from the aqueous phenol phase 30. Such agitation increases the contact area between the respective phases and thus hastens extraction of the dissolved phenol from its aqueous solution. Although the agitation procedure is desirable from the standpoint of hastening extraction of the dissolved substance, it will be understood by those skilled in the art that this procedure is not necessary to the normal function of the novel distributor tube of this invention.

The chloroform extractant solvent 28 containing dissolved phenol then flowed through ports 20 in distributor tube 10 and ascended through chamber 18 to exit ports 22, from which it spilled out into the body of extractor head 34. When the level of the extractant solvent in the body of the extractor head had reached the juncture of return arm 54 the liquid flowed downwardly through the return arm and back into reboiler flask 52, as illustrated by the solid arrows in FIG. 2 of the drawing. The dissolved phenol in each batch of the chloroform solvent which returns to the reboiler flask remains in solution in the flask, but the incoming chloroform is constantly revaporized and sent through the system so that a continuous extraction cycle is maintained. After a sufficient time had elapsed for the chloroform solvent to remove all the phenol from its aqueous solution, a period of about 7 hours, the reboiler flask was disconnected from the system and the chloroform was flashed off under aspirator vacuum. The phenol remaining in the reboiler flask, which set to a solid crystalline mass within an hour, weighed about 2.50 grams.

It will be understood that the embodiment illustrated and described herein is but one example of the operation of the distributor tube of this invention in conjunction with conventional apparatus in the extraction of a solute from a liquid phase with a liquid solvent which is more dense than the phase to be extracted and substantially immiscible therewith. It is contemplated that the distributor tube of this invention would be useful in any extraction process in which a dissolved substance in a liquid phase is extracted with a liquid solvent which is more dense than the phase to be extracted. For example, extraction of steroids from urine with $CCl_4$, or extraction of n-butyric acid from an aqueous solution of the acid with $CHCl_3$ are representative of the types of extraction which may be accomplished with this invention.

Figure 3:
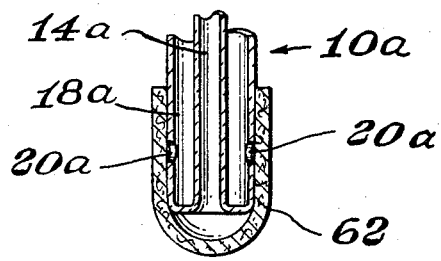
FIG. 3 is a fragmentary vertical sectional view illustrating the preferred form of the distributor tube as used in the extraction of a substance from a finely divided solid material.

In another embodiment of the present invention, as shown in FIG. 3, it is contemplated that the novel distributor tube may be used in the extraction of a soluble constituent from a solid material suspended or dispersed in a liquid medium. For example, it is contemplated that the present distribution tube may be used in the extraction of a carotenoid substance, such as lycopene, from tomato rinds. In such an extraction the dried tomato rinds are finely ground and dispersed in a suitable liquid medium and the lycopene extracted therefrom with a suitable extractant solvent such as chloroform. As shown in FIG. 3, a thimble 62 made of a porous material, such as filter cloth or paper, is fastened over the end of distributor tube 10a opposite funnel-shaped top 11 (not shown in FIG. 3) so that it extends above and completely encloses entry port holes 20a. The porous material of thimble 62 allows the extractant solvent returning from the reflux condenser via conduit 14a to pass out of conduit 14a into the dispersion (not shown) in which distributor tube 10a is immersed. Also, the porosity of the material comprising thimble 62 is such that the extractant solvent containing a substance extracted from the solid material in the dispersion (for example, lycopene) will pass through thimble 62 into entry port holes 20a and thence into chamber 18a, but at the same time thimble 62 will act as a screen to prevent the solid particles in the dispersion medium (for example, tomato rinds) from entering port holes 20a along with the extractant solvent.

Figure 4:
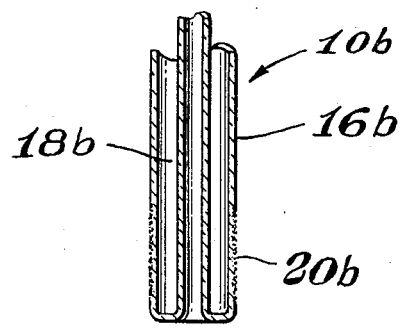
FIG. 4 illustrates a modification of the distributor tube as shown in FIG. 3.

Another modification of the distributor tube of this invention, which is particularly useful in the extraction of a substance from a solid material dispersed in a liquid medium, is represented by the embodiment illustrated in FIG. 4. As shown in FIG. 4, a segment of outer tube 16b, of distributor tube 10b, as indicated at 20b, is fabricated of fritted glass to provide a port for the extractant solvent to enter chamber 18b. The porous structure of the fritted glass allows the extractant solvent to flow through segment 20b into chamber 18b, and at the same time it acts as a screen to prevent any solid particles from entering the chamber along with the extractant solvent.

Additional examples representative of extraction of a soluble constituent from a solid material, in which the above-described embodiments of the distributor tube of this invention might be used, would include extraction of quinine from cinchona bark with $CHCl_3$, extraction of pine oils and rosins from pine wood chips with $CHCl_3$, and the like.

Figure 5:
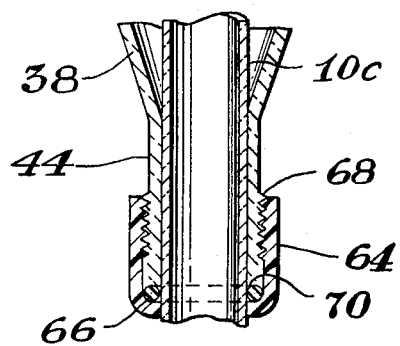
FIG. 5 is a fragmentary vertical sectional view of the distributor tube and an extractor head illustrating an alternative embodiment from that depicted in FIG. 2 for seating the distributor tube in an extractor head and for sealing the extractor head itself.

Still another modification falling within the scope of this invention is an alternative means for providing a liquid tight seal between neck portion 44 of the extractor head and distributor tube 10c. As illustrated in FIG. 5, this embodiment also provides a means for seating distributor tube 10c in neck portion 44 of the extractor head so that the tube may be readily adjusted to any desired position within the extraction flask. FIG. 5 is a fragmentary vertical sectional view of neck portion 44 of the extractor head showing distributor tube 10c seated therein. In this embodiment, neck portion 44 is fabricated with an external thread 68 thereon and a conventional compressible O-ring gasket 66, which is frictionally fitted onto distributor tube 10c and is brought into abutting relationship with peripheral lip 70 of neck portion 44. A conventional internally threaded screw cap 64 with a centrally disposed hole therein is fitted over distributor tube 10c so that it peripherally encloses gasket 66 and threadedly engages external thread 68 of neck portion 44. Thus, when cap 64 is tightened in place, the cap compresses gasket 66 against lip 70 to effect a liquid tight seal between the distributor tube and the extractor head. In this embodiment, it will be understood that the diameter of neck portion 44 of the extractor head and the diameter of screw cap 66 are limited to a size which will allow the throat of an extraction flask (not shown) to fit over the screw cap and engage neck portion 38 of the extractor head. To assure a liquid tight seal, the screw cap should preferably be made of a material resistant to organic solvents and having good tensile and compressive strength. Materials having such characteristics include polymers and copolymers of chlorotrifluoroethylene (Kel–F, 3M Company); tetrafluoroethylene fluorocarbon resins (Teflon, E. I. du Pont); synthetic polyamides (nylon), and the like.

Although the dimensions of the distributor tube are not considered to be critical, the length of the tube should be such that it can be adjusted, i.e. raised or lowered, in the body of the extractor head so that it will effectively operate in extraction flasks ranging from about 100 to 5000 ml. volume, which might contain anywhere from about 25 to 4000 ml. of a solution of dispersion. Obviously the distributor tube in operating position should be adjusted so that funnel-shaped top 11 is above the juncture of return arm 54 with the extractor head so that the solvent (containing extracted material) which is returning to the reboiler flask will not spill over into the distributor tube. In the practice of this invention, the preferred length of the distributor tube is about 28 cm.

While the inventive concept is specifically described in the foregoing specification and the accompanying drawing, it will be understood that numerous modifications and variations with respect to form, size, arrangement of parts, operation and mechanical details may be made without departing from the spirit and scope of this invention.

What is claimed is:

1. In an improved apparatus for continuous extraction of a solute from a liquid phase with an extractant solvent which is more dense than the phase to be extracted and substantially immiscible therewith, comprising generally an extractor head, an extraction flask connected to said extractor head and containing said extractant solvent and said liquid phase, a reboiler flask connected to said extractor head, and a solvent distribution means seated within said extractor head and extending into said extraction flask, the improvement which comprises, a solvent distribution means consisting essentially of a distributor tube having a funnel-shaped top with an outer tube portion and an inner tube portion extending from said top, said inner tube portion defining a conduit through which the extractant solvent may pass into said extraction flask, said outer tube portion enclosing and spaced apart from said inner tube portion, the ends of said inner and outer tube portions opposite said funnel-shaped top being sealingly joined to define a chamber between said tube portions, a first port means located in said outer tube portion near the end opposite said funnel-shaped top, said distributor tube being seated in said extractor head such that said first port means is immersed in said extractant solvent, thereby providing means for said solvent to enter said chamber, a second port means located in said outer tube portion just below said funnel-shaped top, said distributor tube being seated within said extractor head such that said extractant solvent can exit from said chamber through said second port means into said extractor head and thence into said reboiler flask, and means positioned exterior of said distributor tube to provide sealing engagement between said distributor tube and said extractor head and to provide for vertical adjustment of said distributor tube within said extractor head.

2. The apparatus of claim 1 wherein the distributor tube has an integral funnel-shaped top and said inner and outer tube portions extend downwardly from said funnel-shaped top.

3. The apparatus of claim 1 wherein said funnel-shaped top has an inside wall surface which slopes inwardly and downwardly to an annular opening and said inner tube portion is integral with and extends downwardly from said annular opening.

4. The apparatus of claim 1 in which a collar fitted over the distributor tube provides sealing engagement between said distributor tube and said extractor head and provides for vertical adjustment of said distributor tube within said extractor head.

5. The apparatus of claim 1 in which a compressible gasket frictionally fitted over said distributor tube with a screw cap peripherally enclosing said gasket and threadedly engaging said extractor head provides sealing engagement between said distributor tube and said extractor head and provides for vertical adjustment of said distributor tube within said extractor head.

6. In an improved apparatus for continuous extraction of a substance from a solid material in which the extraction is made with a liquid extractant solvent from a dispersion of the solid in a liquid medium, comprising generally an extractor head, an extraction flask connected to said extractor head and containing a mixture of said extractant solvent and said dispersion, a reboiler flask connected to said extractor head, and a solvent distribution means seated within said extractor head and extending into said extraction flask; the improvement which comprises, a solvent distribution means consisting essentially of a distributor tube having a funnel-shaped top with an outer tube portion and an inner tube portion extending from said top, said inner tube portion defining a conduit through which the extractant solvent may pass into said extraction flask, said outer tube portion enclosing and spaced apart from said inner tube portion, the ends of said inner and outer tube portions opposite said funnel-shaped top being sealingly joined to define a chamber between said tube portions, a first port means located in said outer tube portion near the end opposite said funnel-shaped top, said distributor tube being seated in said extractor head such that said first port means is immersed in said dispersion-extractant solvent mixture to provide means for said solvent to enter said chamber, means enclosing said outer tube portion and extending above said first port means to prevent solids in the dispersion from entering said chamber, a second port means located in said outer tube portion just below said funnel-shaped top, said distributor tube being seated within said extractor head such that said extractant solvent can exit from said chamber through said second port means into said extractor head and thence into said reboiler flask, and means positioned exterior of said distributor tube to provide sealing engagement between said distributor tube and said extractor head and to provide for vertical adjustment of said distributor tube within said extractor head.

7. The apparatus of claim 6 wherein the distributor tube has an integral funnel-shaped top and said inner and outer tube portions extend downwardly from said funnel-shaped top.

8. The apparatus of claim 6 wherein said funnel-shaped top has an inside wall surface which slopes inwardly and downwardly to an annular opening and said inner tube portion is integral with and extends downwardly from said annular opening.

9. The apparatus of claim 6 in which a collar fitted over the distributor tube provides sealing engagement between said distributor tube and said extractor head and provides for vertical adjustment of said distributor tube within said extractor head.

10. The apparatus of claim 6 in which a compressible gasket frictionally fitted over said distributor tube with a screw cap peripherally enclosing said gasket and threadedly engaging said extractor head provides sealing engagement between said distributor tube and said extractor head and provides for vertical adjustment of said distributor tube within said extractor head.

11. The apparatus of claim 6 in which a filter cloth thimble placed over the end of the distributor tube opposite the funnel-shaped top encloses said outer tube portion and extends above said first port means therein to prevent solids in the dispersion from entering said chamber.

12. The apparatus of claim 11 in which the thimble is a filter paper.

13. The apparatus of claim 6 in which a segment of the outer tube portion is fabricated of fritted glass to permit entry of the extractant solvent into said chamber and to prevent solid particles in the dispersion from entering said chamber along with the extractant solvent.

References Cited

UNITED STATES PATENTS 2,610,148  9/1952  Lundy _____ 23—267
2,660,518  11/1953  White _____ 23—272.6

SAMIH N. ZAHARNA, *Primary Examiner.*